United States Patent
Yamadaki et al.

(10) Patent No.: US 9,834,065 B2
(45) Date of Patent: Dec. 5, 2017

(54) AIR CONDITIONING DEVICE FOR VEHICLE

(71) Applicant: DENSO CORPORATION, Kariya, Aichi-pref. (JP)

(72) Inventors: Hirokazu Yamadaki, Kariya (JP); Shinichirou Hirai, Kariya (JP); Tomohiro Kamiya, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/105,604

(22) PCT Filed: Dec. 11, 2014

(86) PCT No.: PCT/JP2014/006169
§ 371 (c)(1),
(2) Date: Jun. 17, 2016

(87) PCT Pub. No.: WO2015/093014
PCT Pub. Date: Jun. 25, 2015

(65) Prior Publication Data
US 2016/0325603 A1 Nov. 10, 2016

(30) Foreign Application Priority Data
Dec. 19, 2013 (JP) .................. 2013-262367

(51) Int. Cl.
*B60H 1/32* (2006.01)
*F25B 39/00* (2006.01)
(Continued)

(52) U.S. Cl.
CPC .......... *B60H 1/3233* (2013.01); *F25B 39/00* (2013.01); *F25D 21/14* (2013.01); *F25B 39/02* (2013.01)

(58) Field of Classification Search
CPC .............. B60H 1/3233; F24F 2013/227; F24F 13/222; F25D 21/14
See application file for complete search history.

(56) References Cited

U.S. PATENT DOCUMENTS

2007/0163772 A1* 7/2007 Bhatti .................. F28F 1/126
165/202
2016/0001637 A1 1/2016 Kume et al.

FOREIGN PATENT DOCUMENTS

JP 2001130244 A 5/2001
JP 2003118358 A 4/2003
(Continued)

*Primary Examiner* — Cassey D Bauer
(74) *Attorney, Agent, or Firm* — Harness, Dickey & Pierce, P.L.C.

(57) ABSTRACT

In an interior air conditioning unit, a divided case is provided with a main water receiver, a main drain port, a side wall, a secondary drain port, a partition wall, a notch, a droplet reservoir, a path, and a tilted portion. The side wall, the secondary drain port, the notch, the droplet reservoir, the path, and the tilted portion are respectively located such that a condensate water flows out of the main water receiver and reaches the secondary drain port through the notch before a water surface of the condensate water reaches a fitting portion between the divided cases. According to the above-described configuration, the condensate water produced in the cooling heat exchanger can be certainly prevented from leaking through the fitting portion of the air conditioning case.

10 Claims, 12 Drawing Sheets

(51) Int. Cl.
*F25D 21/14* (2006.01)
*F25B 39/02* (2006.01)

(56) References Cited

FOREIGN PATENT DOCUMENTS

| JP | 2006069441 A | 3/2006 |
|----|--------------|--------|
| JP | 2007118754 A | 5/2007 |
| JP | 2014184952 A | 10/2014 |

\* cited by examiner

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2014/006169 filed on Dec. 11, 2014 and published in Japanese as WO 2015/093014 A1 on Jun. 25, 2015. This application is based on and claims the benefit of priority from Japanese Patent Application No. 2013-262367 filed on Dec. 19, 2013. The entire disclosures of all of the above applications are incorporated herein by reference.

TECHNICAL FIELD

The present disclosure relates to a vehicle air conditioner.

BACKGROUND ART

Conventionally, an interior air conditioning unit for a vehicle air conditioner has an air conditioning case housing an evaporator, a drain port of the air conditioning case, and a drain hose connected to the drain port. Condensate water produced in the evaporator is drained from the drain port to outside of a vehicle compartment through the drain hose (refer to, for example, Patent Literature 1).

PRIOR ART LITERATURES

Patent Literature

Patent Literature 1: JP 2001-130244 A

SUMMARY OF INVENTION

According to studies by the inventors of the present disclosure, the condensate water produced in the evaporator can be drained from the drain port to outside of the vehicle compartment through the drain hose in the vehicle air conditioner of Patent Literature 1. However, there is the following possibility when the drain hose is blocked for some reason.

For example, the condensate water may flow out of the air conditioning case from a fitting portion in which any pair of divided cases of the air conditioning case fit together in a case where plural divided cases fit together to configure the air conditioning case. Accordingly, electronic devices may be watered by the condensate water leaking outside of the air conditioning case, and the electronic devices may have an abnormality, in a case where the electronic devices having no waterproofness are located around the air conditioning case.

The present disclosure addresses the above issues, and it is an objective of the present disclosure to provide an air conditioning device for a vehicle that is able to suppress a leaking of condensate water produced in a cooling heat exchanger from a fitting portion of an air conditioning case.

An air conditioning device for a vehicle has an air conditioning case, a cooling heat exchanger, a first water receiver, a first drain hole, a second water receiver, a second drain hole, a side wall, a partition wall, an opening, and a droplet reservoir. The air conditioning case is configured by fitting a plurality of divided cases together and configures an air passage guiding air toward a vehicle compartment of the vehicle. The cooling heat exchanger has a flat shape, is arranged on a condition of being erected in the air conditioning case, and cools the air. The first water receiver receives a condensate water produced in the cooling heat exchanger. The first drain hole drains the condensate water from the first water receiver to an outside of the vehicle compartment. The second water receiver t is located on a downstream side of the first water receiver in an airflow direction and receives the condensate water. The second drain hole is formed in a bottom portion of the second water receiver on one side in a width direction of the cooling heat exchanger. The second drain hole drains the condensate water from the second water receiver to the outside of the vehicle compartment through a pathway that is different from a pathway to drain the condensate water from the first drain hole to the outside of the vehicle compartment. The side wall is located in the second water receiver on an other side in the width direction of the cooling heat exchanger and forms the second water receiver. The partition wall partitions the first and second water receivers from each other. The opening is formed in the partition wall. The first and second water receivers communicate with each other through the opening. The droplet reservoir is recessed in the bottom portion of the second water receiver and stores a droplet of the condensate water from the cooling heat exchanger. The air conditioning case has a fitting portion in which two of the plurality of the divided cases fit together. The opening, the side wall, the droplet reservoir and the second drain hole are arranged respectively such that the condensate water flows out of the first water receiver and reaches the second drain hole through the opening before a water surface of the condensate water reaches the fitting portion.

According to the air conditioning device for a vehicle of the present disclosure, the condensate water flows out of the first water receiver and reaches the second drain hole through the opening before the water surface of the condensate water reaches the fitting portion of the air conditioning case when the first drain hole is blocked for some reason. Accordingly, components located around the air conditioning case can be prevented from being watered by the condensate water leaking through the fitting portion of the air conditioning case. Therefore, components having no waterproofness can be prevented from having abnormality due to the condensate water.

The width direction is a left-right direction perpendicular to an upper-lower direction in the cooling heat exchanger on a condition where the cooling heat exchanger is erected. The airflow direction is a direction in which air passing through the cooling heat exchanger flows and is perpendicular to the width direction.

Here, a distribution of an airflow, which flows out of the cooling heat exchanger, in the width direction may be turbulent by the side wall when the side wall is eccentrically arranged on one side or the other side in the width direction.

On the other hand, according to the air conditioning device for a vehicle of the present disclosure, the side wall is located in a center area of the cooling heat exchanger in the width direction. Accordingly, the distribution of the airflow, which flowing out of the cooling heat exchanger, can be prevented from being turbulent.

Further, the distribution of the airflow, which flows out of the cooling heat exchanger, in the width direction may be turbulent by the opening when the opening is eccentrically located on one side or the other side in the width direction.

According to the air conditioning device for a vehicle of the present disclosure, the opening is located in the center area of the cooling heat exchanger in the width direction.

Accordingly, the distribution of the airflow, which flowing out of the cooling heat exchanger, can be prevented from being turbulent.

DESCRIPTION OF EMBODIMENTS

An air conditioning device for a vehicle according to an embodiment of the present disclosure will be described hereafter referring to FIG. 1 through FIG. 12.

In FIG. 1 through FIG. 11, arrows indicate directions on a condition of being mounted in the vehicle. An arrow indicating front indicates forward in a traveling direction of the vehicle, and an arrow indicating rear indicates backward in the traveling direction of the vehicle. An arrow indicating upper indicates upward in an upper-lower direction, and an arrow indicating lower indicates downward in the upper-lower direction. An arrow indicating right indicates rightward in a vehicle width direction (i.e., a left-right direction of the vehicle), and an arrow indicating left indicates leftward in the vehicle width direction. In the present embodiment, a right-hand drive vehicle that uses a right front seat as a driver seat is assumed as the vehicle in which the air conditioning device for a vehicle is mounted.

The air conditioning device for a vehicle has an interior air conditioning unit 10 and a blower unit (illustration is omitted) as shown in FIG. 1 through FIG. 4. The interior air conditioning unit 10 is located in a center area of a lower portion of a dashboard (i.e., an instrument panel). The blower unit is located to be offset toward a passenger seat side with respect to the interior air conditioning unit 10.

Figure 4:
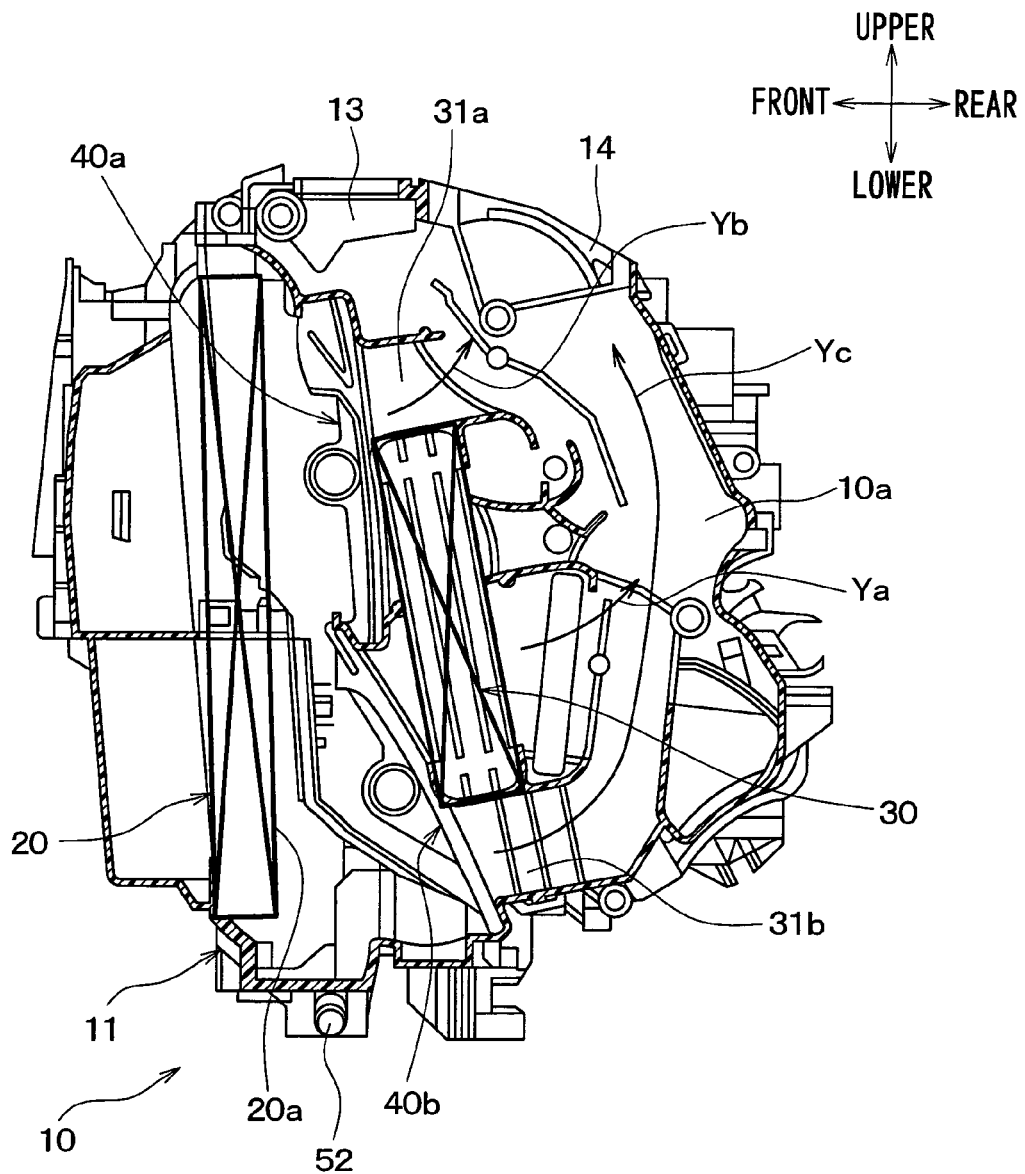
FIG. 4 is a cross-sectional view taken along a line IV-IV shown in FIG. 3.
Figure 5:
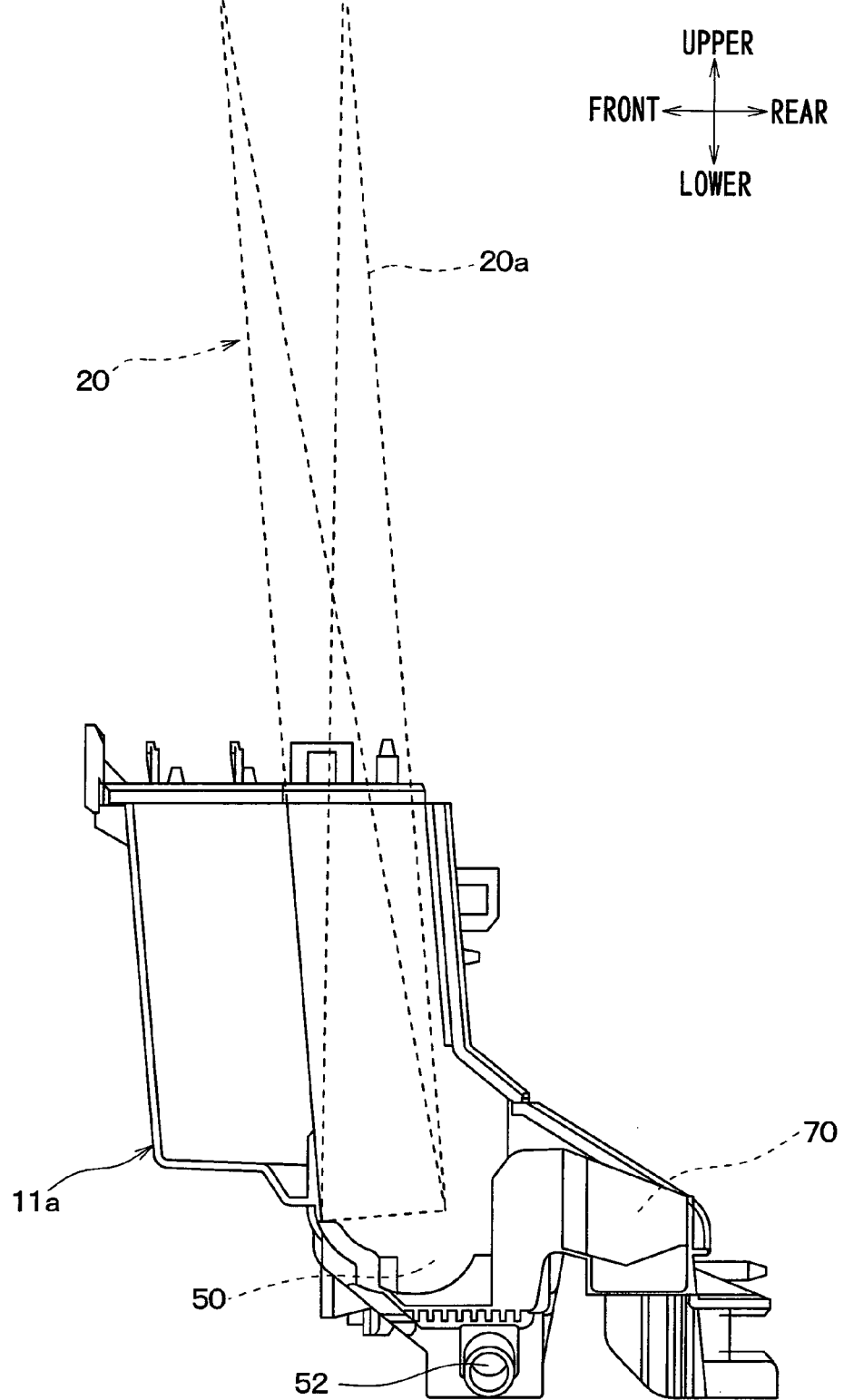
FIG. 5 is a view illustrating divided cases and a cooling heat exchanger of FIG. 1 when viewed from left.

The interior air conditioning unit 10 has an air conditioning case 11 that configures an air passage 10a guiding air, which is blown from the blower unit, toward a vehicle compartment (refer to FIG. 4). The air conditioning case 11 has divided cases 11a, 11b, 11c, 11d, 11e. The divided cases 11a, 11b, 11c, 11d, 11e are made of resin material such as polypropylene.

The divided cases 11a, 11b are located on a front side of the divided cases 11c, 11d, 11e. The divided case 11a is located on a lower side of the divided case 11b in the upper-lower direction. The divided case 11c is located on a left side of the divided case 11d. The divided case 11d is located on a left side of the divided case 11e.

Figure 1:
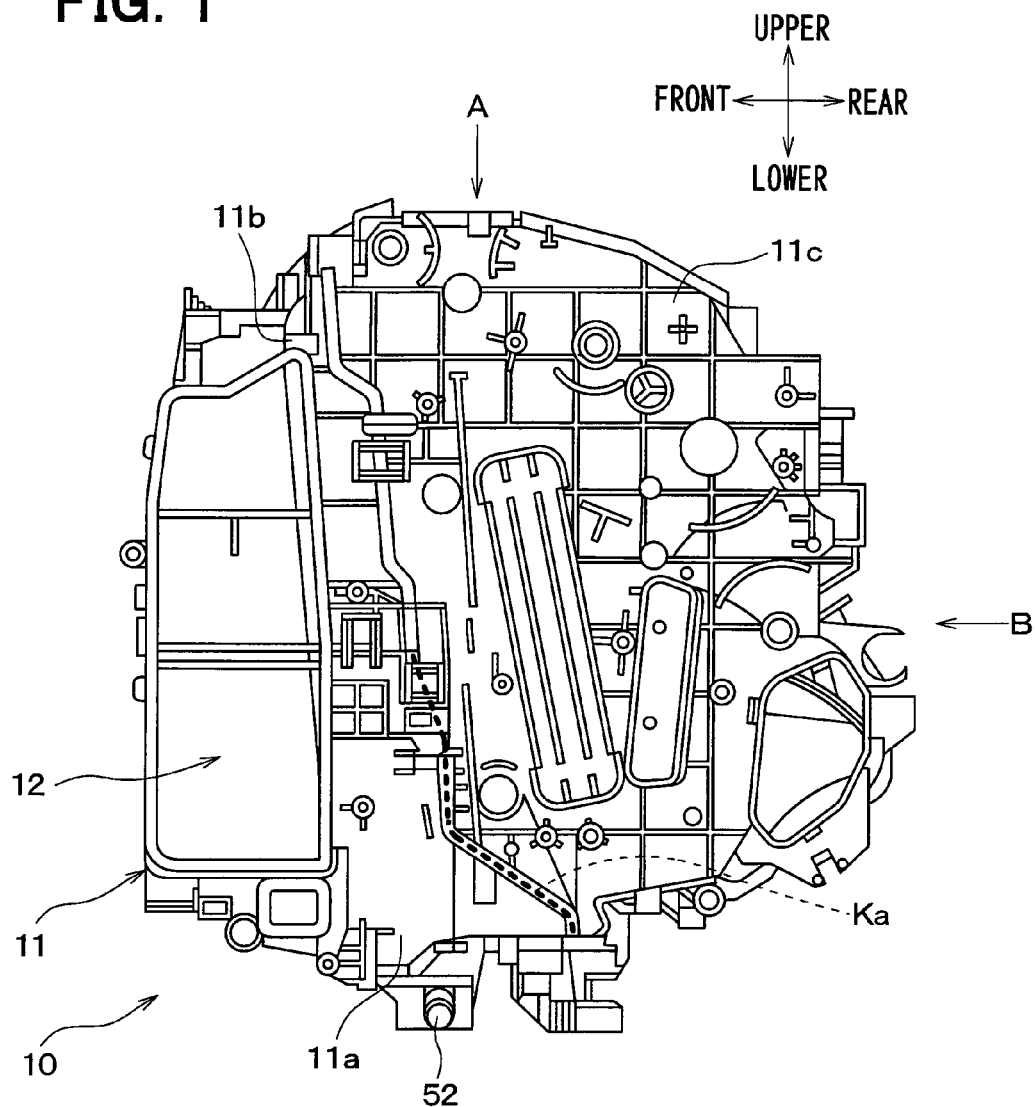
FIG. 1 is a view illustrating an air conditioning device for a vehicle when viewed from left, according to an embodiment of the present disclosure.
Figure 2:
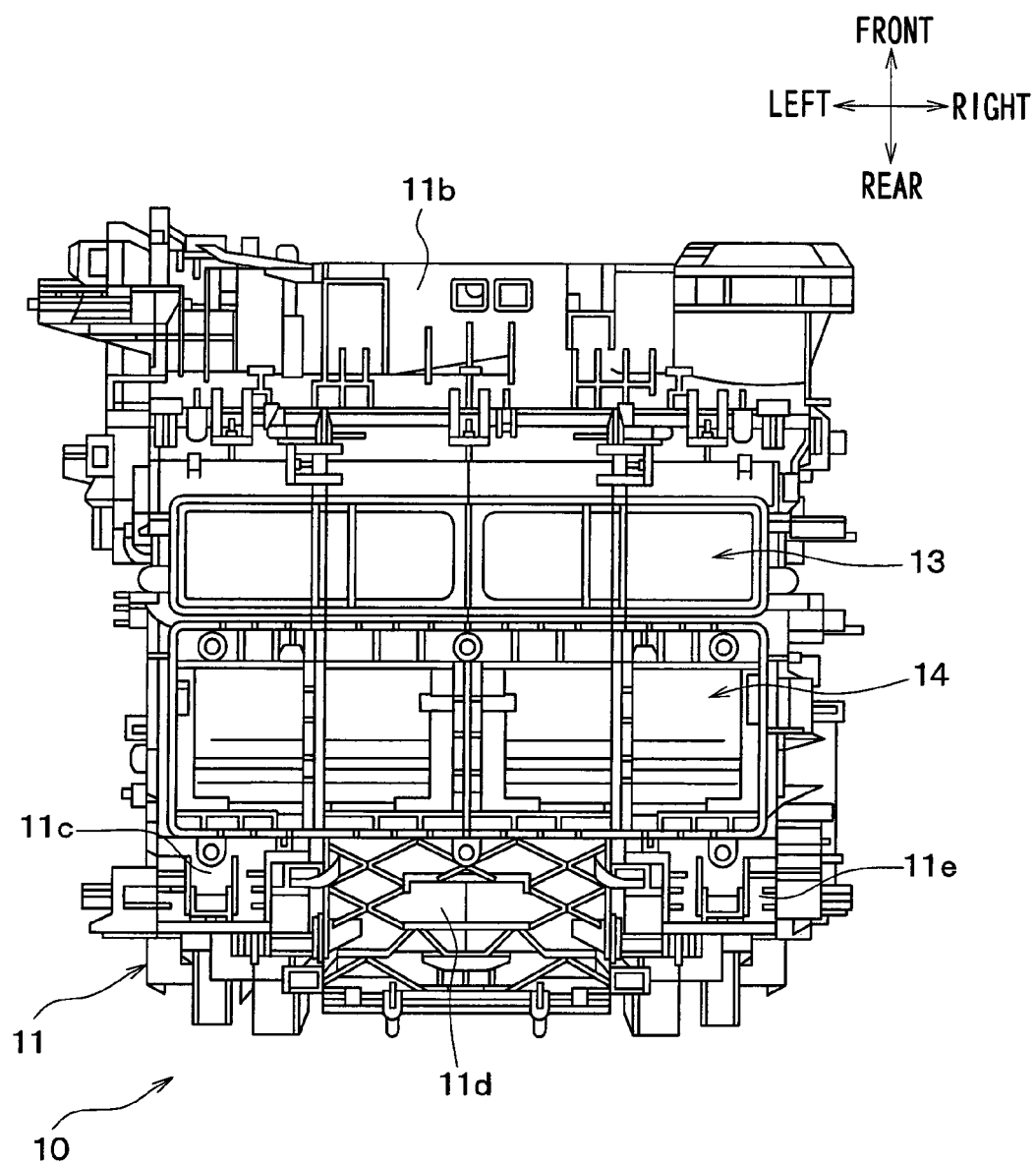
FIG. 2 is a view that is viewed in a direction shown by an arrow A in FIG. 1.
Figure 3:
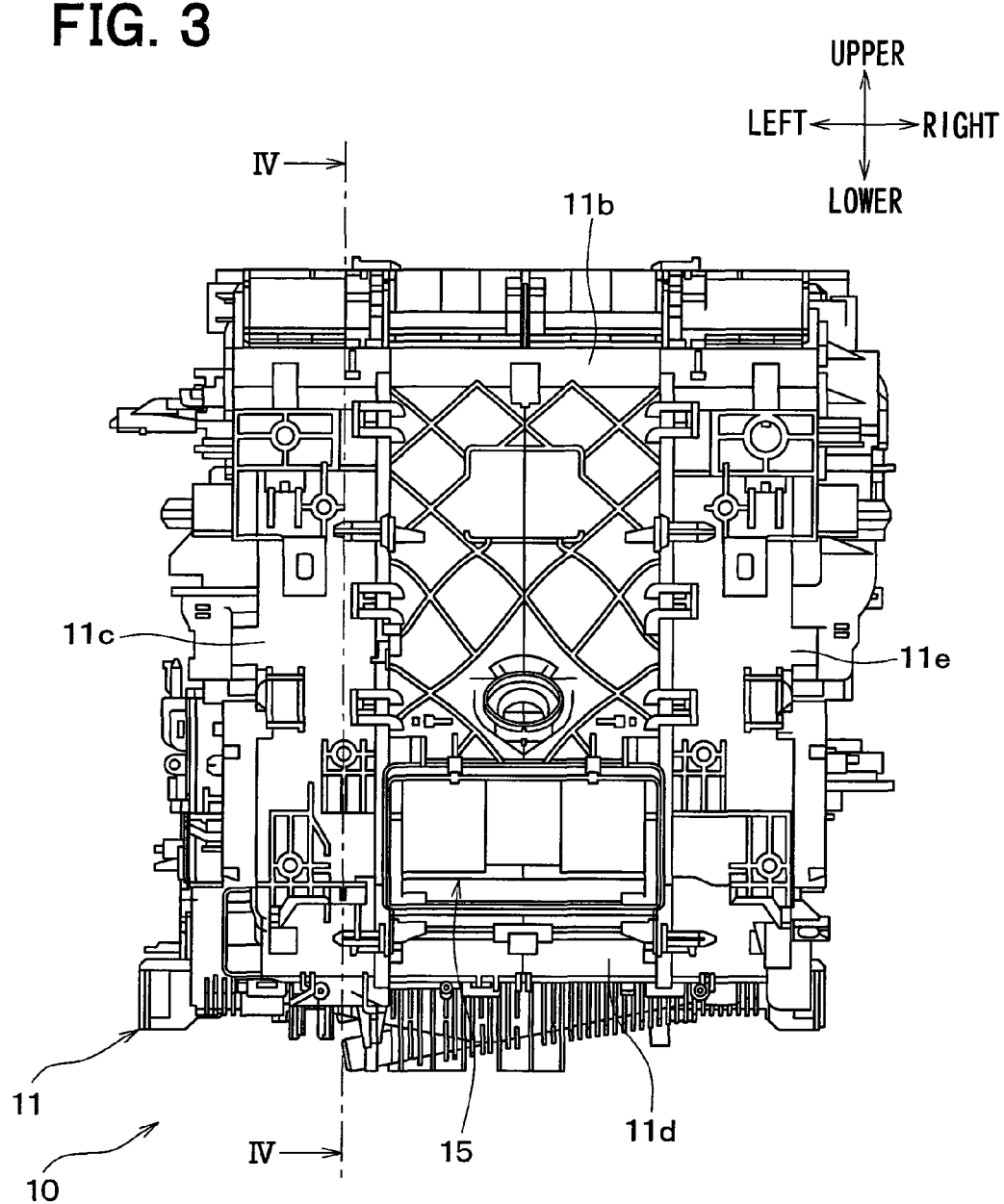
FIG. 3 is a view that is viewed in a direction shown by an arrow B in FIG. 1.

The divided cases 11a, 11b fit together. The divided cases 11c, 11d fit together. The divided cases 11d, 11e fit together. Each of the divided cases 11a, 11b fits together with the divided case 11c. Each of the divided cases 11a, 11b fits together with the divided case 11e. Accordingly, fitting portions in which corresponding two of divided cases 11a, 11b, 11c, 11d, 11e fit together are formed in the air conditioning case 11. For example, a fitting portion Ka shown in FIG. 1 is a fitting portion in which the divided cases 11a, 11c fit together.

An air intake port 12 is provided on a left side in the air conditioning case 11. The air intake port 12 is an opening that takes in air, which is blown from the blower unit, to the air passage 10a. The air conditioning case 11 is provided with a defroster opening 13, a face opening 14, and a foot opening 15. The defroster opening 13 blows conditioned air after passing through the air passage 10a toward an inner surface of a windshield of the vehicle. The face opening 14 blows the conditioned air after passing through the air passage 10a toward an upper body of a passenger. The foot opening 15 blows the conditioned air after passing through the air passage 10a toward a lower body of the passenger.

Mode doors (illustration is omitted) are disposed in the defroster opening 13, the face opening 14, and the foot opening 15, respectively, to open or close the openings. The defroster opening 13, the face opening 14, and the foot opening 15 will be collectively referred to as openings 13, 14, 15 hereafter.

The interior air conditioning unit 10 has a cooling heat exchanger 20, a heating heat exchanger 30, and air mix doors 40a, 40b as shown in FIG. 4. The cooling heat exchanger 20 has a first and second tanks and a heat exchange core that is located between the first and second tanks. The cooling heat exchanger 20 has a flat shape. The heat exchange core is configured by tubes that are arranged one after another in the vehicle width direction between the first and second tanks and heat exchange fins that are respectively located on a surface of each of the tubes. An air outlet surface 20a is formed in the heat exchange core on one side in a thickness direction.

The cooling heat exchanger 20 is located on a rear side of the air intake port 12 in the air conditioning case 11. The air outlet surface 20a of the cooling heat exchanger 20 is parallel with the vehicle width direction on a condition that the cooling heat exchanger 20 is erected. A width direction of the cooling heat exchanger 20 coincides with the vehicle width direction. The width direction of the cooling heat exchanger 20 is a direction (i.e., a left-right direction of the cooling heat exchanger 20) perpendicular to the upper-lower direction on the condition that the cooling heat exchanger 20 is erected. Accordingly, the cooling heat exchanger 20 has the air outlet surface 20*a* facing a rear side.

According to the present embodiment, an upper portion of the cooling heat exchanger 20 is located to be offset slightly forward with respect to a lower portion, and the air outlet surface 20*a* is tilted with respect to the upper-lower direction, on the condition that the cooling heat exchanger 20 is erected.

The cooling heat exchanger 20 has a compressor, a condenser, and an expansion valve and configures a refrigerant cycle device in which refrigerant circulates. Air taken in from the air intake port 12 is cooled by the refrigerant and flows out from the air outlet surface 20*a*.

Figure 6:
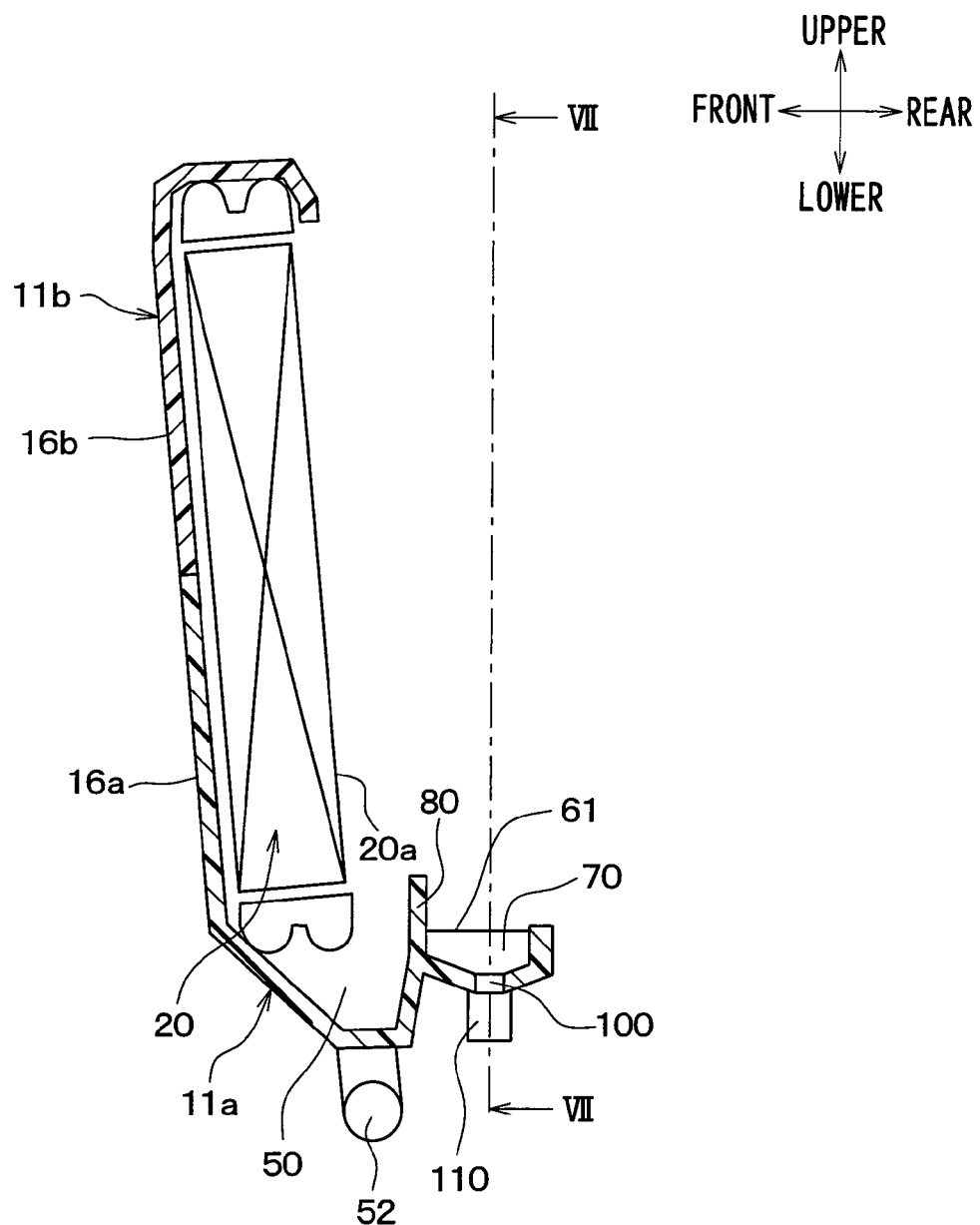
FIG. 6 is a cross-sectional view illustrating the divided case and the cooling heat exchanger of FIG. 1.
Figure 7:
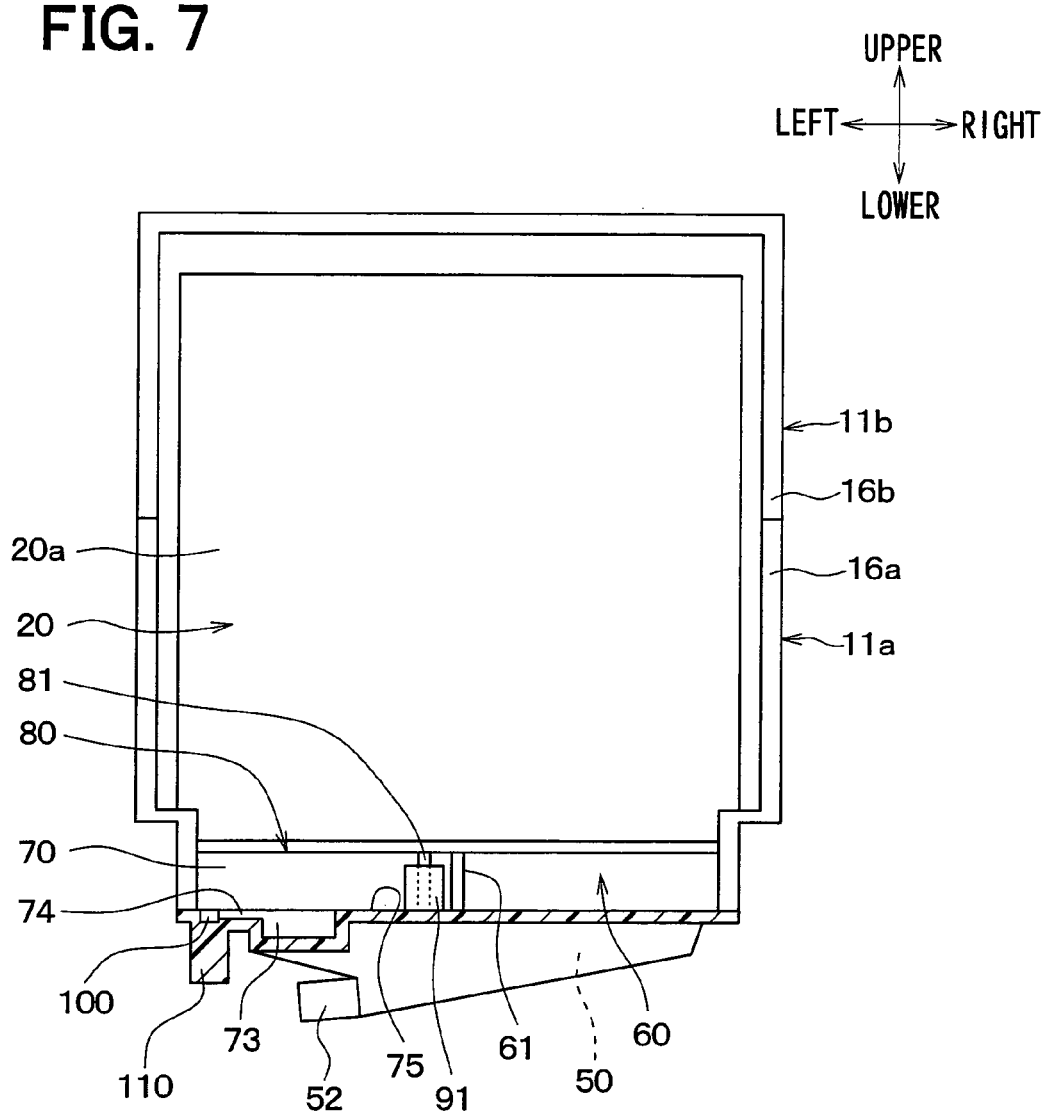
FIG. 7 is a cross-sectional view taken along a line VII-VII shown in FIG. 6.

The cooling heat exchanger 20 is supported by a retainer 16*a* of the divided case 11*a* (refer to FIG. 6) and a retainer 16*b* of the divided case 11*b*. The retainers 16*a*, 16*b* are formed to retain the cooling heat exchanger 20 from both sides in the vehicle width direction. FIG. 6 is a cross-sectional view showing a condition where the retainers 16*a*, 16*b* are retaining the cooling heat exchanger 20. The divided case 11*a* is provided with a drain structure to drain condensate water produced in the cooling heat exchanger 20. A structure of the divided case 11*a* will be described in detail after.

The heating heat exchanger 30 is located on a downstream side of the cooling heat exchanger 20 in the airflow direction in the air conditioning case 11. Cool air flowing out of the cooling heat exchanger 20 is heated by warm water (i.e., engine cooling water) in the heating heat exchanger 30 and flows toward the openings 13, 14, 15 as shown by an arrow Ya. The heating heat exchanger 30 is supported by the divided cases 11*c*, 11*d*.

A bypass passage 31*a* is formed on an upper side of the heating heat exchanger 30 in the air conditioning case 11. A bypass passage 31*b* is formed on a lower side of the heating heat exchanger 30 in the air conditioning case 11. The cool air flowing out of the cooling heat exchanger 20 flows in the bypass passages 31*a*, 31*b* as shown by arrows Yb, Yc to bypass the heating heat exchanger 30 and flows toward the openings 13, 14, 15.

The air mix doors 40*a*, 40*b* are located on an upstream side of the heating heat exchanger 30 in the airflow direction. The air mix door 40*a* changes a ratio between a volume of air passing through the heating heat exchanger 30 and a volume of air passing through the bypass passage 31*a* by changing a ratio between an opening area of the heating heat exchanger 30 and an opening area of the bypass passage 31*a*. The air mix door 40*b* changes a ratio between a volume of air passing through the heating heat exchanger 30 and a volume of air passing through the bypass passage 31*b* by changing a ratio between an opening area of the heating heat exchanger 30 and an opening area of the bypass passage 31*b*.

That is, the air mix doors 40*a*, 40*b* changes a ratio between the volume of air passing through the heating heat exchanger 30 and the volume of air passing through the bypass passages 31*a*, 31*b*. Accordingly, a temperature of the conditioned air blown from the openings 13, 14, 15 into the vehicle compartment can be changed. According to the present embodiment, for example, a slide door is used as the air mix doors 40*a*, 40*b*.

The structure of the divided case 11*a* of the present embodiment will be described in detail referring to FIG. 5 through FIG. 11.

The divided case 11*a* is provided with a main water receiver 50 as a first water receiver to receive the condensate water produced in the cooling heat exchanger 20 as shown in FIG. 5 through FIG. 8. The main water receiver 50 is recessed downward in the upper-lower direction from a right under position to a rear side.

A main drain port (i.e., a first drain hole) 52 is provided in a bottom portion 51 of the main water receiver 50 to drain the condensate water to outside of the vehicle compartment. A drain hose (illustration is omitted) is connected to the main drain port 52. The drain hose is used to guide the condensate water drained from the main drain port 52.

The divided case 11*a* has a recessed portion 60 that is located on a rear side of the main water receiver 50. The recessed portion 60 is recessed downward in the upper-lower direction over an entire length in the width direction of the cooling heat exchanger 20. A side wall 61 is formed in a center area of the recessed portion 60 in the vehicle width direction. That is, the side wall 61 is located on a downstream side of a center portion of the cooling heat exchanger 20 in the width direction. The side wall 61 divides the recessed portion 60 into one side (i.e., a left side) in the vehicle width direction and the other side (i.e., a right side) in the vehicle width direction and defines the one side in the vehicle width direction as a secondary water receiver 70. That is, the side wall 61 is a side wall that is located on the other side (i.e., the right side) of the secondary water receiver and forms the secondary water receiver 70.

Figure 8:
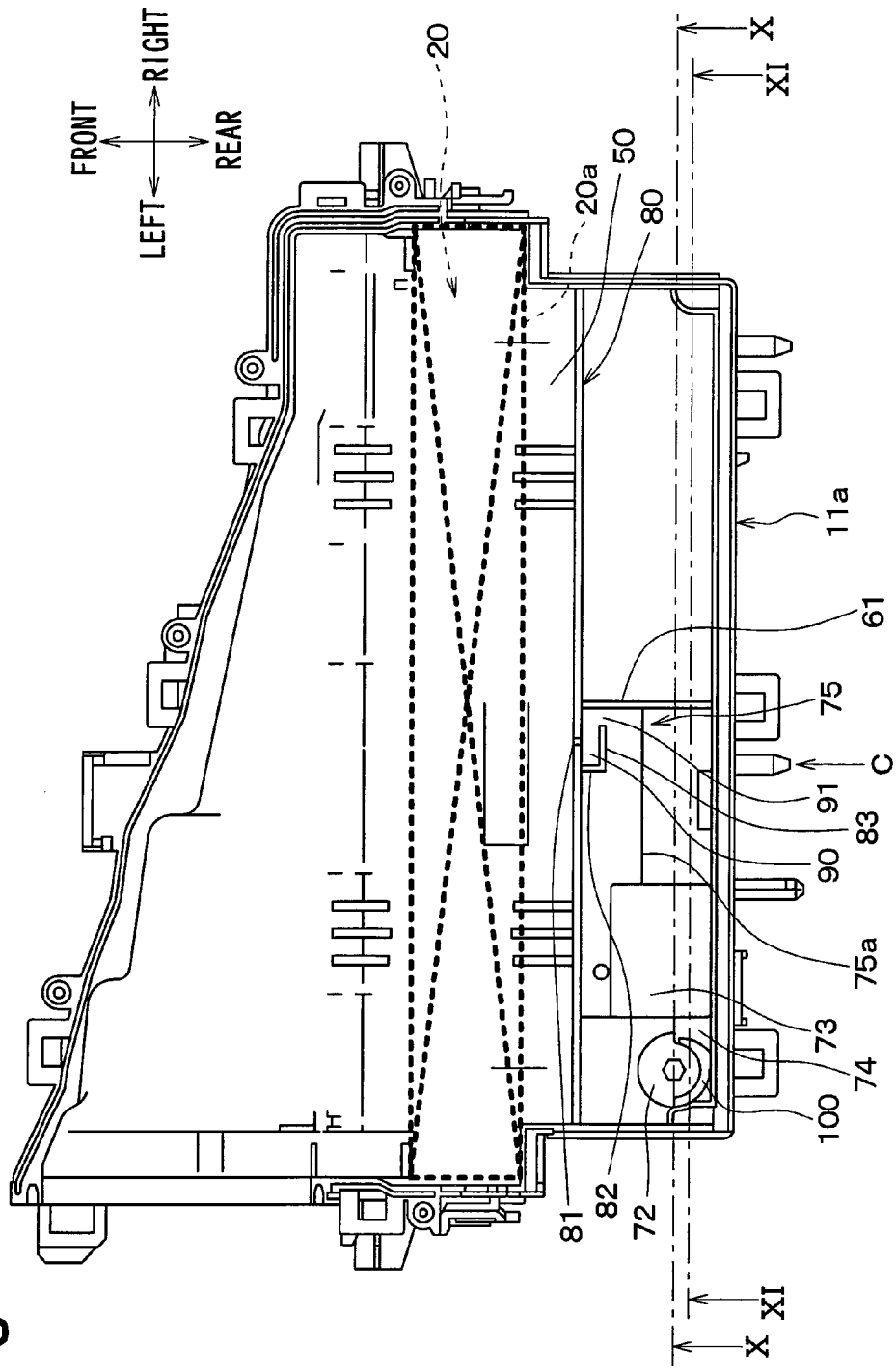
FIG. 8 is a top view illustrating the divided cases and the cooling heat exchanger of FIG. 1.
Figure 9:
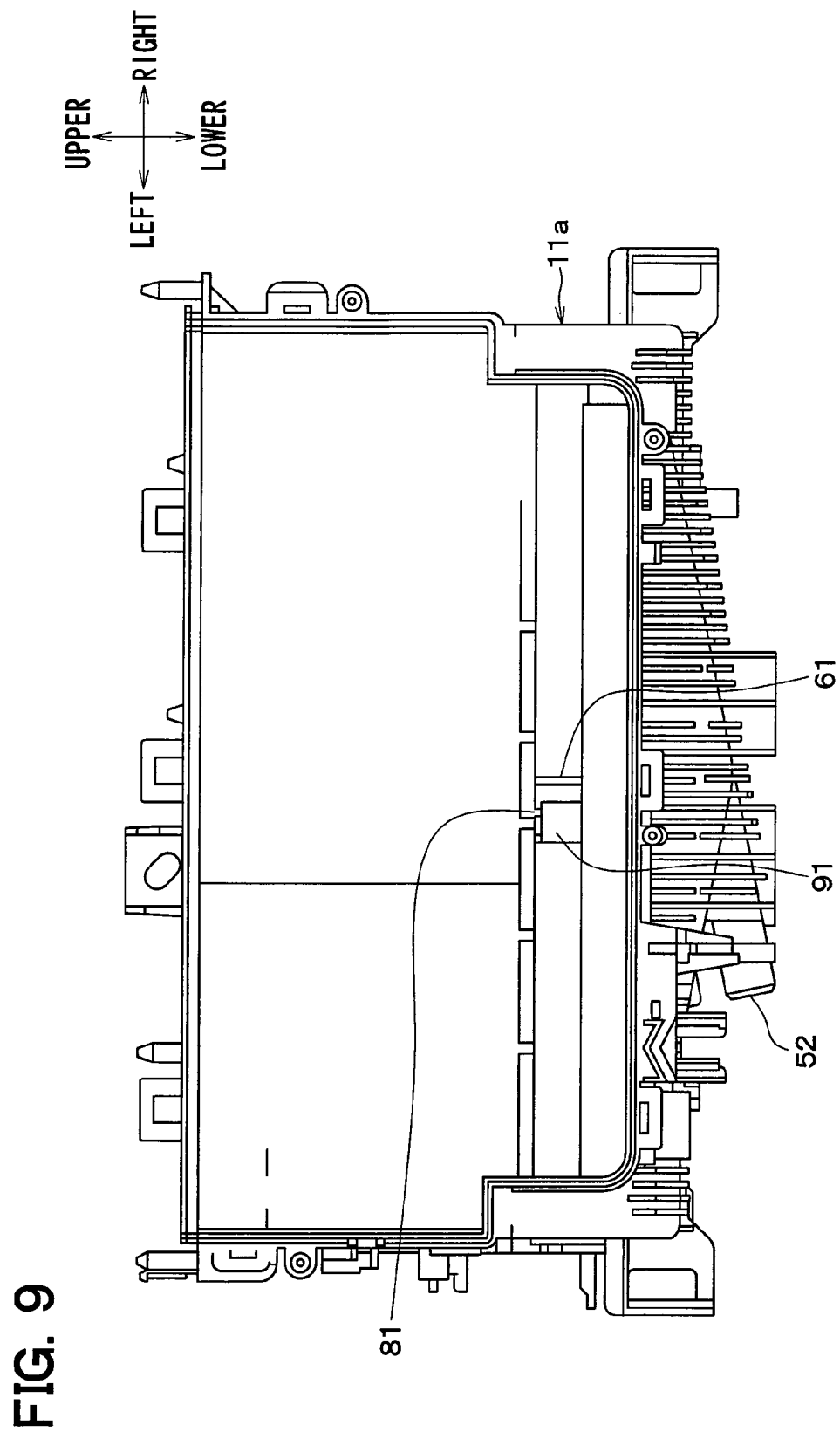
FIG. 9 is a view that is viewed in a direction shown by an arrow C in FIG. 8 on a condition of omitting the cooling heat exchanger.
Figure 10:
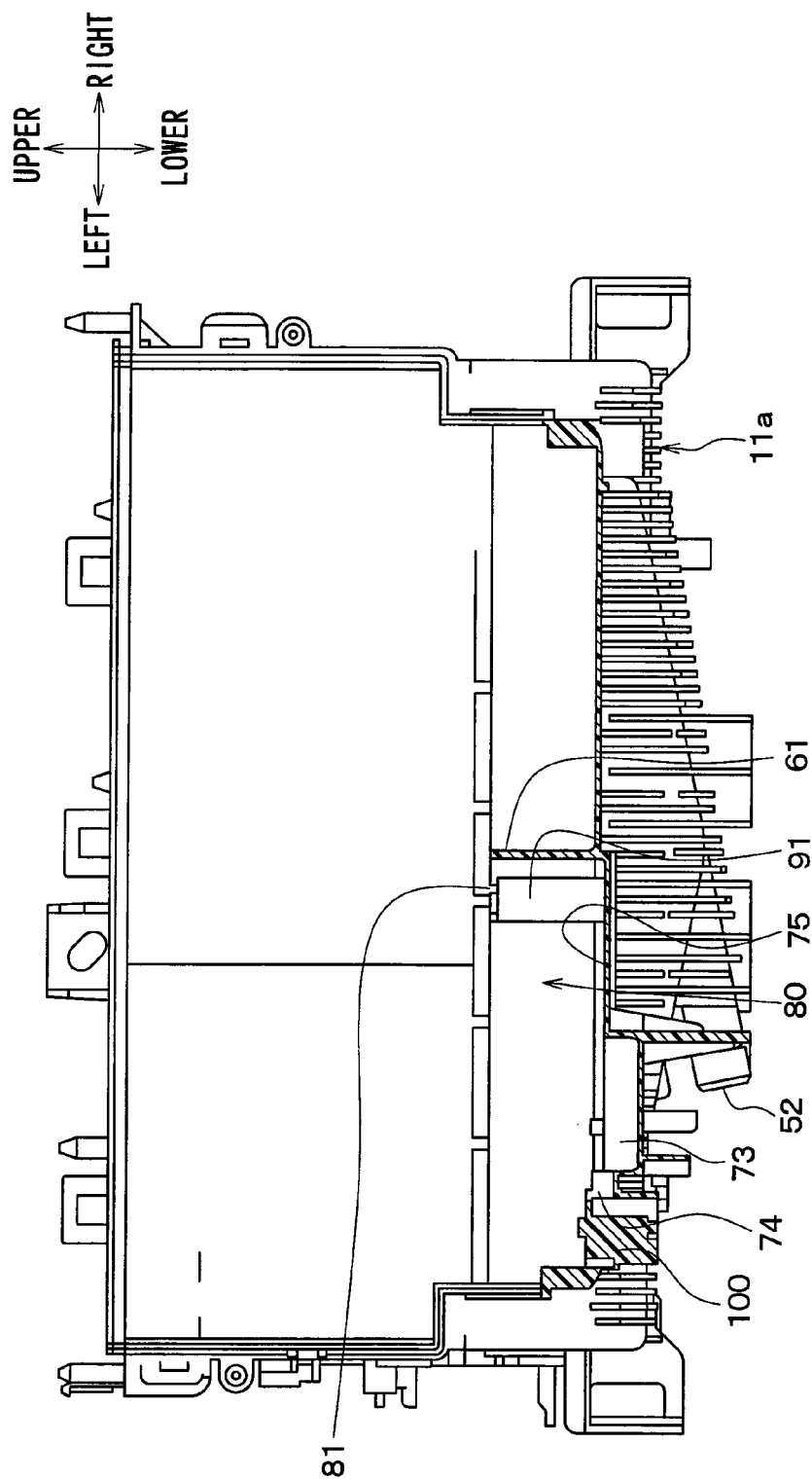
FIG. 10 is a cross-sectional view taken along a line X-X shown in FIG. 8 on a condition of omitting the cooling heat exchanger.
Figure 11:
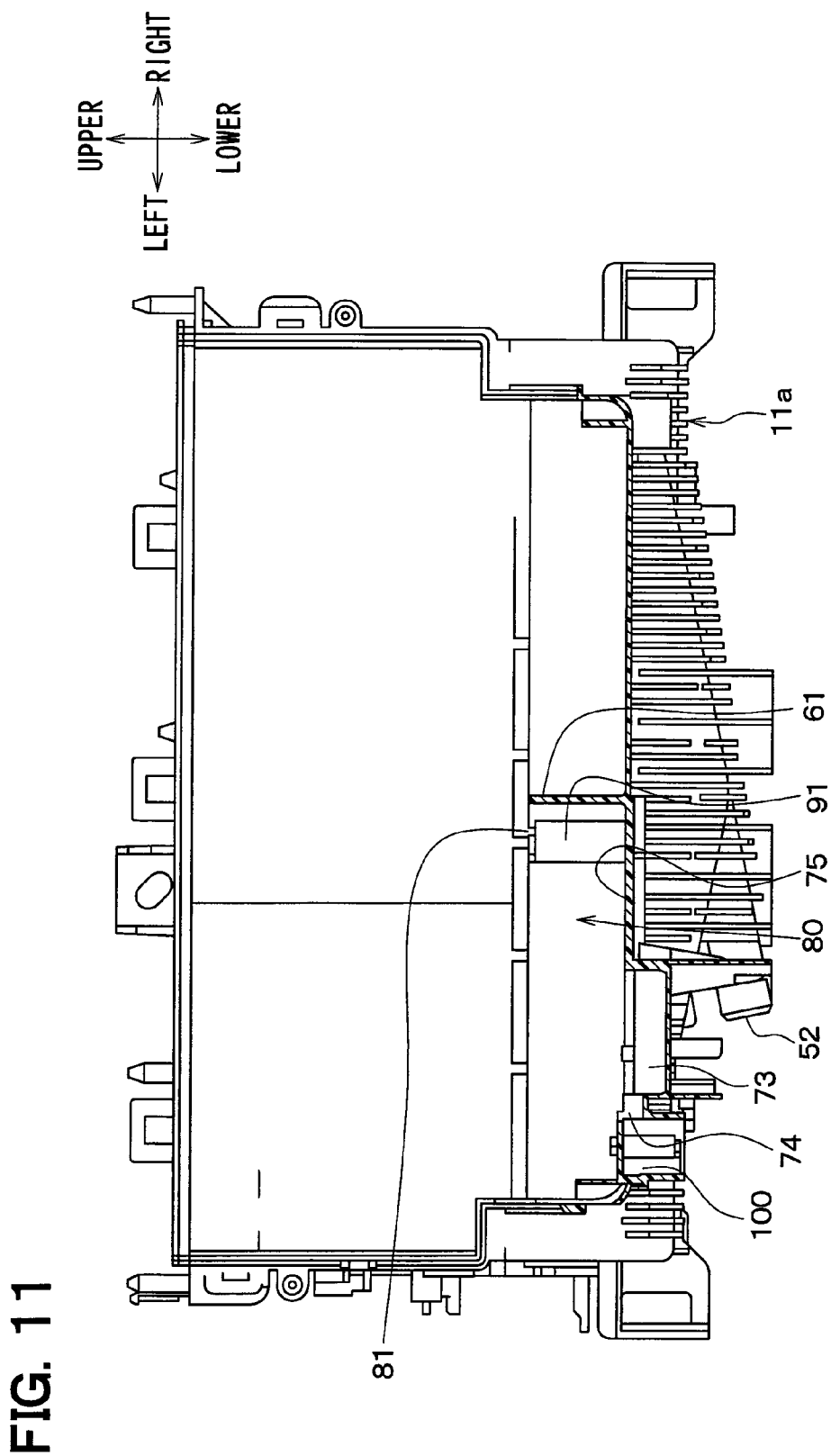
FIG. 11 is a cross-sectional view taken along a line XI-XI shown in FIG. 8 on a condition of omitting the cooling heat exchanger.

A partition wall 80 is formed between the main water receiver 50 and the recessed portion 60 in the divided case 11*a*. The partition wall 80 is formed over an entire length in the width direction of the cooling heat exchanger as shown in FIG. 8. That is, the partition wall 80 partitions the main water receiver 50 and the secondary water receiver 70 from each other. The secondary water receiver 70 is a second water receiver that receives the condensate water from the cooling heat exchanger 20.

A notch 81 is formed in the partition wall 80. The notch 81 is an opening through which the main water receiver 50 and the secondary water receiver 70 communicate with each other. The notch 81 is located on a side adjacent to the side wall 61 in the partition wall 80, that is, located in a center area in the width direction of the cooling heat exchanger 20. The notch 81 is formed to drain the condensate water from the main water receiver 50 to the secondary water receiver 70.

Walls 82, 83 forming a labyrinth seal structure are provided in the secondary water receiver 70 on a side adjacent to the notch 81 (refer to FIG. 8). The wall 82 is located on an opposite side of the side wall 61 with respect to the notch 81. In other words, the notch 81 is located between the wall 82 and the side wall 61 in the left-right direction. The wall 82 is a first wall that protrudes from the partition wall 80 toward a downstream side of the cooling heat exchanger 20 in the airflow direction. In other words, the wall 82 protrudes from the partition wall 80 toward an opposite side that is opposite from the cooling heat exchanger 20. The wall 83 is a second wall that protrudes from the wall 82 toward the side wall 61.

Here, an area surrounded by the walls 82, 83, the partition wall 80, and the side wall 61 is defined as an area 90, and an area between the wall 83 and the side wall 61 is defined as an area 91. In the labyrinth seal structure, air is prevented from flowing from the main water receiver 50 to a secondary drain port (i.e., a second drain hole) 100 through the notch 81 and the areas 90, 91.

The secondary drain port 100 is located in the secondary water receiver 70 on one side in the vehicle width direction (i.e., a left side). The secondary drain port 100 passes through the bottom portion of the secondary water receiver 70 downward in the upper-lower direction. A valve member 110 that limits a flow of air between the secondary drain port 100 and the vehicle compartment is connected to the secondary drain port 100.

The bottom portion of the secondary water receiver 70 has a cover 72 that has a substantially circular shape and protrudes upward in the upper-lower direction. The cover 72 covers the secondary drain port 100 from an upper side. Accordingly, the secondary drain port 100 opens toward an upper side in the upper-lower direction in a substantially crescent shape (refer to FIG. 8).

A droplet reservoir 73 is formed in the bottom portion of the secondary water receiver 70 on a side adjacent to the secondary drain port 100 with respect to the notch 81. In other words, the droplet reservoir 73 is located between the notch 81 and the secondary drain port 100 in the left-right direction in the secondary water receiver 70. The droplet reservoir 73 is recessed downward in the upper-lower direction and stores droplets of the condensate water from the cooling heat exchanger 20.

A path 74 is formed in the bottom portion of the secondary water receiver 70 between the droplet reservoir 73 and the secondary drain port 100. The path 74 is recessed over an entire length between the droplet reservoir 73 and the secondary drain port 100 and guides the condensate water from the droplet reservoir 73 to the secondary drain port 100. A bottom portion of the path 74 is located on an upper side of a bottom portion of the droplet reservoir 73 in the upper-lower direction.

A tilted portion 75 is formed in the bottom portion of the secondary water receiver 70 over an entire length between the side wall 61 and the droplet reservoir 73. A recessed portion 75a is formed in a center area of the tilted portion 75 in the airflow direction over an entire length between the side wall 61 and the droplet reservoir 73. Accordingly, the tilted portion 75 is tilted to decline from an upstream side to a center in the airflow direction and decline from a downstream side to the center in the airflow direction.

According to the present embodiment, the side wall 61, the secondary drain port 100, the partition wall 80, the notch 81, the droplet reservoir 73, and the tilted portion 75 are respectively located on a downstream side of the cooling heat exchanger 20 in the airflow direction and on a lower side of the center area of the cooling heat exchanger 20 in the upper-lower direction.

There may be a possibility that a pathway between the main water receiver 50 and an outside of the vehicle compartment is blocked for some reason. According to the present embodiment, the notch 81, the side wall 61, the droplet reservoir 73, the tilted portion 75, the secondary drain port 100, and the path 74 are respectively located such that the condensate water flows out of the main water receiver 50 and reaches the secondary drain port 100 through the notch 81 before a water surface of the condensate water in the main water receiver 50 reaches the fitting portion between the divided cases 11a, 11c or the fitting portion between the divided cases 11a, 11d.

An operation of the air conditioning device for a vehicle according to the present embodiment will be described hereafter.

Air to be blown from the blower unit is taken in the air conditioning case 11 from the air intake port 12. The intake air flows to a rear side and passes through the cooling heat exchanger 20. On this occasion, the air is cooled by the refrigerant in the cooling heat exchanger 20. Accordingly, cool air flows out of the cooling heat exchanger 20. A part of the cool air flows to the heating heat exchanger 30, and the rest of the cool air flows to the bypass passages 31a, 31b.

The cool air flowing to the heating heat exchanger 30 is heated by warm water and flows out of the heating heat exchanger 30 as warm air. Thus, the warm air flowing out of the heating heat exchanger 30 and the cool air passing through the bypass passages 31a, 31b are mixed and blown into the vehicle compartment from the openings 13, 14, 15 as the conditioned air.

The air mix doors 40a, 40b can adjust a temperature of the conditioned air that is blown into the vehicle compartment from the openings 13, 14, 15 by changing the ratio between the volume of air passing through the heating heat exchanger 30 and the volume of air passing through the bypass passages 31a, 31b.

The condensate water is produced in the cooling heat exchanger 20 when air taken in from the air intake port 12 is cooled by the refrigerant in the cooling heat exchanger 20. The condensate water flows to the main water receiver 50 along the cooling heat exchanger 20. Subsequently, the condensate water is drained from the main water receiver 50 to outside of the vehicle compartment through the main drain port 52 and the drain hose.

When droplets of the condensate water (will be referred to simply as droplets hereafter) spatter by air passing through the cooling heat exchanger 20, the secondary water receiver 70 receives the droplets. For example, droplets received by the tilted portion 75 of the secondary water receiver 70 are collected in the recessed portion 75a of the tilted portion 75 and flow to the droplet reservoir 73 along the recessed portion 75a. Accordingly, the droplets are stored in the droplet reservoir 73. Subsequently, the droplets are evaporated from the droplet reservoir 73 into the air conditioning case 11. That is, the droplets from the cooling heat exchanger are evaporated from the bottom portion of the secondary water receiver 70 into the air conditioning case 11. The cover 72 prevents the droplets from coming into the secondary drain port 100 even when the droplets drop from an above area of the secondary drain port 100.

Thus, the condensate water produced in the cooling heat exchanger 20 is drained from the main drain port 52 to outside of the vehicle compartment without being drained from the secondary drain port 100 to outside of the vehicle compartment in a normal state that the main water receiver 50 and the outside of the vehicle compartment communicate with each other by the main drain port 52 and the drain hose.

Further, the labyrinth seal structure is formed by the walls 82, 83, the partition wall 80, and the side wall 61 in the secondary water receiver 70 on the side adjacent to the notch 81. Accordingly, cool air blown from the cooling heat exchanger 20 is prevented from flowing toward the notch 81, the areas 90, 91, and the secondary drain port 100.

On the other hand, the condensate water in the main water receiver 50 is not drained from the main drain port 52 and stored in the main water receiver 50 in an abnormal state that the pathway between the main water receiver 50 and the outside of the vehicle is blocked for some reasons. Accordingly, the water surface of the condensate water in the main water receiver 50 rises when the condensate water flows from the cooling heat exchanger 20 into the main water receiver 50.

On this occasion, the condensate water flows out of the main water receiver 50 and reaches the secondary drain port 100 through the notch 81, the areas 90, 91, the tilted portion 75, the droplet reservoir 73, and the path 74 before the water surface of the condensate water in the main water receiver 50 reaches the fitting portion between the divided cases 11a, 11c (or the fitting portion between the divided cases 11a, 11d). That is, the condensate water flows from the main water receiver 50 to the secondary drain port 100 through the notch 81, the tilted portion 75, the droplet reservoir 73, and the path 74 before the water surface of the condensate water in the main water receiver 50 reaches the fitting portion between the divided cases 11a, 11c or the fitting portion between the divided cases 11a, 11d.

Figure 12A:
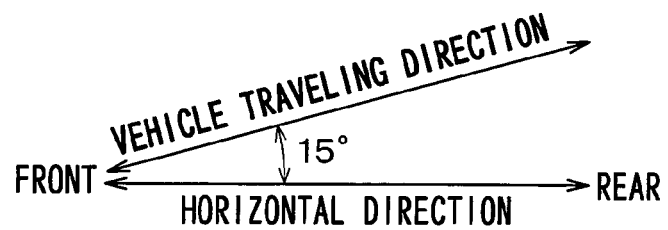
FIG. 12A is a view showing an inclination angle of the vehicle in which the air conditioning device of FIG. 1 is mounted.
Figure 12B:
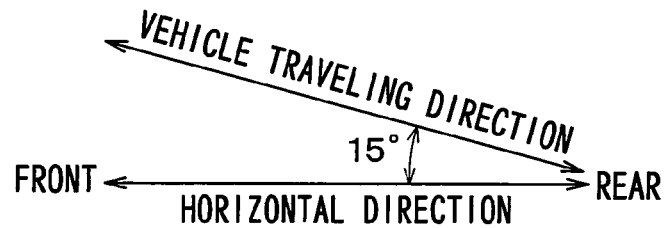
FIG. 12B is a view showing an inclination angle of the vehicle in which the air conditioning device of FIG. 1 is mounted.

Similarly, as shown in FIGS. 12A, 12B, the condensate water flows from the main water receiver 50 to the secondary drain port 100 through the notch 81, the tilted portion 75, the droplet reservoir 73, and the path 74 before the water surface of the condensate water reaches the fitting portion between the divided cases 11a, 11c (or the fitting portion between the divided cases 11a, 11d) on a condition that the traveling direction of the vehicle inclines at an angle of 15° with respect to the horizontal direction.

FIG. 12A shows a condition that a front side of the vehicle is located on a lower side of a rear side of the vehicle, and that the traveling direction inclines at the angle of 15° with respect to the horizontal direction. FIG. 12B shows a condition that the front side of the vehicle is located on an upper side of the rear side of the vehicle, and that the traveling direction inclines at the angle of 15° with respect to the horizontal direction.

Figure 12C:
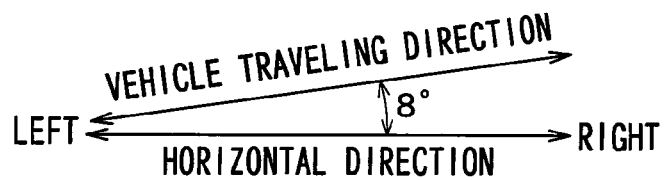
FIG. 12C is a view showing an inclination angle of the vehicle in which the air conditioning device of FIG. 1 is mounted.
Figure 12D:
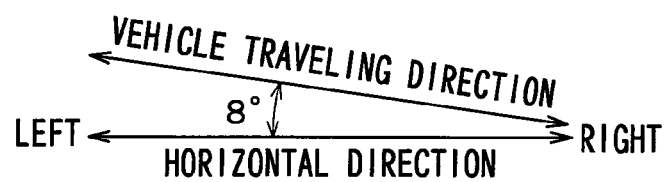
FIG. 12D is a view showing an inclination angle of the vehicle in which the air conditioning device of FIG. 1 is mounted.

As shown in FIGS. 12C, 12D, the condensate water flows from the main water receiver 50 to the secondary drain port 100 through the notch 81, the tilted portion 75, the droplet reservoir 73, and the path 74 before the water surface of the condensate water reaches the fitting portion between the divided cases 11a, 11c (or the fitting portion between the divided cases 11a, 11d) on a condition that the vehicle width direction of the vehicle inclines at an angle of 8° with respect to the horizontal direction.

FIG. 12C shows a condition that a left side of the vehicle in the vehicle width direction is located on a lower side of a right side of the vehicle in the vehicle width direction, and that the vehicle width direction inclines at the angle of 8° with respect to the horizontal direction. FIG. 12D shows a condition that the left side of the vehicle in the vehicle width direction is located on an upper side of the right side of the vehicle in the vehicle width direction, and that the vehicle width direction inclines at the angle of 8° with respect to the horizontal direction.

For example, a side adjacent to the side wall 61 is located on an upper side of a side adjacent to the secondary drain port 100 in the bottom portion of the secondary water receiver 70 on a condition that the left side of the vehicle in the vehicle width direction is located on the upper side of the right side of the vehicle in the vehicle width direction and that the vehicle width direction inclines at the angle of 8° with respect to the horizontal direction. On this occasion, the water surface of the condensate water in the secondary water receiver 70 may extend over an entire length between the notch 81 and the secondary drain port 100 on a condition that the condensate water is stored in the droplet reservoir 73. As a result, the condensate water flows from the main water receiver 50 to the secondary drain port 100 through the notch 81 even when the left side of the vehicle in the vehicle width direction is located on the upper side of the right side of the vehicle in the vehicle width direction.

Furthermore, the condensate water flows from the main water receiver 50 to the secondary drain port 100 through the notch 81, the tilted portion 75, the droplet reservoir 73, and the path 74 before the water surface of the condensate water reaches the fitting portion between the divided cases 11a, 11c (or the fitting portion between the divided cases 11a, 11d) on a condition that the traveling direction of the vehicle inclines at the angle of 15° with respect to the horizontal direction, and that the vehicle width direction inclines at the angle of 8° with respect to the horizontal direction.

As described above, the condensate water flows from the main water receiver 50 to the secondary drain port 100 through the notch 81, the tilted portion 75, the droplet reservoir 73, and the path 74 before the water surface of the condensate water reaches the fitting portion between the divided cases 11a, 11c (or the fitting portion between the divided cases 11a, 11d) even when the vehicle inclines with respect to the horizontal direction. Therefore, the condensate water from the secondary drain port 100 can flow to the passenger seat side in the vehicle compartment through different pathway that is different from the pathway to drain the condensate water from the main drain port to outside of the vehicle compartment without leaking from the fitting portion between the divided cases 11a, 11c (or the divided cases 11a, 11d).

According to the above-described embodiment, the divided case 11a of the air conditioning device for a vehicle has the main water receiver 50, the main drain port 52, the side wall 61, the secondary drain port 100, the partition wall 80, the notch 81, the droplet reservoir 73, the path 74, and the tilted portion 75. The main water receiver 50 receives the condensate water produced in the cooling heat exchanger 20. The main drain port 52 drains the condensate water from the main water receiver 50 to outside of the vehicle compartment. The secondary water receiver 70 is located on the downstream side of the main water receiver 50 in the airflow direction and receives the condensate water. The side wall 61 is located on the right side of the secondary water receiver 70 in the vehicle width direction and forms the secondary water receiver 70. The secondary drain port 100 is located on the left side in the vehicle width direction in the bottom portion of the secondary water receiver 70 and drains the condensate water from the secondary water receiver 70 to a passenger seat side in the vehicle compartment. The partition wall 80 partitions the main water receiver 50 and the secondary water receiver 70 from each other. The notch 81 is formed in the partition wall 80 on a side adjacent to the side wall 61. The main water receiver 50 and the secondary water receiver 70 communicate with each other through the notch 81. The droplet reservoir 73 is located between the notch 81 and the secondary drain port 100 in the bottom portion of the secondary water receiver 70 and recessed downward. The tilted portion 75 is provided over the entire length between the side wall 61 and the droplet reservoir 73 and declines from the downstream side and the upstream side in the airflow direction toward the center (i.e., the recessed portion 75a). The tilted portion 75 collects the droplets from the cooling heat exchanger 20 and guides the droplets to the droplet reservoir 73. The path 74 guides the condensate water from the droplet reservoir 73 to the secondary drain port 100. The side wall 61, the secondary drain port 100, the notch 81, the droplet reservoir 73, the path 74, and the tilted portion 75 are respectively located such that the condensate water flows out of the main water receiver 50 and reaches the secondary drain port 100 through the notch 81 before the water surface of the condensate water reaches the fitting portion between the divided cases 11a, 11c (or the fitting portion between the divided cases 11a, 11d).

Therefore, the condensate water flows out of the main water receiver 50 and reaches the secondary drain port 100 through the notch 81 before the water surface of the condensate water reaches the fitting portion between the divided cases 11a, 11c (or the fitting portion between the divided cases 11a, 11d) when the pathway between the main water receiver 50 and outside of the vehicle compartment is blocked for some reasons. Accordingly, a leaking of the condensate water through the fitting portion of the air conditioning case 11 can be suppressed. Therefore, components having no waterproofness can be prevented from having abnormality due to the condensate water.

According to the present embodiment, the side wall 61 is located in the center area of the cooling heat exchanger 20 in the width direction.

Here, a distribution of an airflow, which flows out of the cooling heat exchanger 20, in the width direction may be turbulent by the side wall 61 when the side wall 61 is eccentrically arranged on one side or the other side in the vehicle width direction. On the other hand, according to the present embodiment, a turbulence of the distribution of the airflow, which flows out of the cooling heat exchanger 20, in the width direction can be suppressed since the side wall 61 is located in the center area of the cooling heat exchanger 20 in the width direction as described above.

In addition, according to the present embodiment, the notch 81 is located in the center area of the cooling heat exchanger 20 in the width direction (i.e., in a portion near the side wall 61). Accordingly, the turbulence of the distribution of the airflow, which flows out of the cooling heat exchanger 20, in the width direction can be suppressed.

According to the present embodiment, as described above, the side wall 61, the secondary drain port 100, the partition wall 80, the notch 81, the droplet reservoir 73, and the tilted portion 75 are respectively located on the downstream side of the cooling heat exchanger 20 in the airflow direction and on the lower side of the center area of the cooling heat exchanger 20 in the upper-lower direction. Accordingly, the side wall 61, the secondary drain port 100, the partition wall 80, the notch 81, the droplet reservoir 73, and the tilted portion 75 can suppress the turbulence of the distribution of the airflow, which flows out of the cooling heat exchanger 20, in the width direction.

According to the present embodiment, the labyrinth seal structure is formed in the secondary water receiver 70 on the side adjacent to the notch 81 by the walls 82, 83, the partition wall 80, and the side wall 61. Accordingly, cool air blown from the cooling heat exchanger 20 is prevented from flowing toward the notch 81, the areas 90, 91, and the secondary drain port 100. Additionally, the turbulence of the distribution of the airflow, which is blown from the cooling heat exchanger 20, in the width direction can be suppressed.

According to the present embodiment, as described above, the bottom portion of the path 74 is located on the upper side of the bottom portion of the droplet reservoir 73 in the upper-lower direction. Therefore, the condensate water (i.e., the droplets) is prevented from flowing from the droplet reservoir 73 to the secondary drain port 100 in the normal state that the main water receiver 50 and the outside of the vehicle compartment communicate with each other through the main drain port 52.

(Other Modifications)

Although an example in which the path 74, the tilted portion 75, and the droplet reservoir 73 are formed in the bottom portion of the secondary water receiver 70 is described in the above-described embodiment, it may be modified as (a), (b), (c) as described below.

(a) Only the droplet reservoir 73 of the path 74, the tilted portion 75, and the droplet reservoir 73 may be formed in the bottom portion of the secondary water receiver 70.

In this case, the side wall 61, the secondary drain port 100, the notch 81, and the droplet reservoir 73 are respectively located such that the condensate water flows out of the main water receiver 50 and reaches the secondary drain port 100 through the notch 81 before the water surface of the condensate water reaches the fitting portion of the air conditioning case 11.

(b) Only the tilted portion 75 and the droplet reservoir 73 of the path 74, the tilted portion 75, and the droplet reservoir 73 may be formed in the bottom portion of the secondary water receiver 70.

In this case, the side wall 61, the secondary drain port 100, the notch 81, the tilted portion 75, and the droplet reservoir 73 are respectively located such that the condensate water flows out of the main water receiver 50 and reaches the secondary drain port 100 through the notch 81 before the water surface of the condensate water reaches the fitting portion of the air conditioning case 11.

(c) Only the path 74 and the droplet reservoir 73 of the path 74, the tilted portion 75, and the droplet reservoir 73 may be formed in the bottom portion of the secondary water receiver 70.

In this case, the side wall 61, the secondary drain port 100, the notch 81, the path 74, and the droplet reservoir 73 are respectively located such that the condensate water flows out of the main water receiver 50 and reaches the secondary drain port 100 through the notch 81 before the water surface of the condensate water reaches the fitting portion of the air conditioning case 11.

In the above-described embodiment, an example in which the tilted portion 75 is located on the right side of the droplet reservoir 73 in the vehicle width direction (i.e., the width direction of the cooling heat exchanger 20) is described. However, the tilted portion 75 may be located on a left side of the droplet reservoir 73 in the vehicle width direction.

In the above-described embodiment, an example in which the condensate water from the secondary water receiver 70 is drained to the passenger seat side in the vehicle compartment through the secondary drain port 100 is described. However, the condensate water from the secondary water receiver 70 may be drained to a driver seat side in the vehicle compartment through the secondary drain port 100.

In the above-described embodiment, an example in which the one side (i.e., the left side) of the side wall 61 in the vehicle width direction in the recessed portion 60 is defined as the secondary water receiver 70. However, the other side (i.e., a right side) of the side wall 61 in the vehicle width direction in the recessed portion 60 may be defined as the secondary water receiver 70. In this case, a structure to drain the condensate water to the passenger seat side in the vehicle compartment through the secondary drain port 100 can be configured easily in a case of applying the air conditioning device for a vehicle of the present disclosure to a vehicle using a front left seat as a driver seat.

In the above-described embodiment, an example in which the main water receiver 50, the secondary water receiver 70, and the partition wall 80 is configured by the divided case 11a is described. However, the main water receiver 50, the secondary water receiver 70, and the partition wall 80 may be configured separately from the divided case 11a.

The present disclosure is not limited to the above-described embodiments and can be modified within the scope of the present disclosure. The above-described embodiments are not unrelated to each other and can be combined with each other except for a case where the combination is clearly improper.

What is claimed is:

1. An air conditioning device for a vehicle comprising:
   an air conditioning case that is configured by fitting a plurality of divided cases together and configures an air passage guiding air toward a vehicle compartment of the vehicle;
   a cooling heat exchanger that has a flat shape, is arranged on a condition of being erected in the air conditioning case, and cools the air;
   a first water receiver that receives a condensate water produced in the cooling heat exchanger;
   a first drain hole that drains the condensate water from the first water receiver to an outside of the vehicle compartment;
   a second water receiver that is located on a downstream side of the first water receiver in an airflow direction and receives the condensate water;
   a second drain hole that is formed in a bottom portion of the second water receiver on one side in a width direction of the cooling heat exchanger, the second drain hole that drains the condensate water from the second water receiver to the outside of the vehicle compartment through a pathway that is different from a pathway to drain the condensate water from the first drain hole to the outside of the vehicle compartment;
   a side wall that is located in the second water receiver on an other side in the width direction of the cooling heat exchanger and forms the second water receiver;
   a partition wall that partitions the first and second water receivers from each other;
   an opening that is formed in the partition wall, the opening through which the first and second water receivers communicate with each other; and
   a droplet reservoir that is recessed in the bottom portion of the second water receiver and stores a droplet of the condensate water from the cooling heat exchanger, wherein
   the air conditioning case has a fitting portion in which two of the plurality of the divided cases fit together, and
   the opening, the side wall, the droplet reservoir, and the second drain hole are arranged respectively such that the condensate water flows out of the first water receiver and reaches the second drain hole through the opening before a water surface of the condensate water reaches the fitting portion.

2. The air conditioning device for a vehicle according to claim 1, further comprising
   a tilted portion that is located in the bottom portion of the second water receiver on one side or an other side of the droplet reservoir in the width direction of the cooling heat exchanger, wherein
   the tilted portion declines from a downstream side and an upstream side in the airflow direction toward a center in the airflow direction, and
   the tilted portion accumulates the droplet of the condensate water and guides the droplet to the droplet reservoir.

3. The air conditioning device for a vehicle according to claim 1, further comprising
   a path that is located between the second drain hole and the droplet reservoir in the bottom portion of the second water receiver and guides the condensate water from the droplet reservoir to the second drain hole.

4. The air conditioning device for a vehicle according to claim 1, further comprising
   a recessed portion that is located on a downstream side of the first water receiver in the airflow direction and recessed downward over an entire length in the width direction of the cooling heat exchanger, wherein
   the side wall divides the recessed portion into one side and an other side in the width direction of the cooling heat exchanger and defines the one side of the recessed portion as the second water receiver.

5. The air conditioning device for a vehicle according to claim 4, wherein
   the side wall is located in a center area of the recessed portion in the width direction of the cooling heat exchanger.

6. The air conditioning device for a vehicle according to claim 1, wherein
   the opening is located in a center area of the partition wall in the width direction of the cooling heat exchanger.

7. The air conditioning device for a vehicle according to claim 1, wherein
   the opening, the side wall, the droplet reservoir, and the second drain hole are arranged respectively on a condition that a width direction of the vehicle inclines at an angle of 8° with respect to a horizontal direction, such that the condensate water flows out of the first water receiver and reaches the second drain hole through the opening before a water surface of the condensate water reaches the fitting portion.

8. The air conditioning device for a vehicle according to claim 1, wherein
   the opening, the side wall, the droplet reservoir, and the second drain hole are arranged respectively on a condition that a traveling direction of the vehicle inclines at an angle of 15° with respect to a horizontal direction, such that the condensate water flows out of the first water receiver and reaches the second drain hole through the opening before a water surface of the condensate water reaches the fitting portion.

9. The air conditioning device for a vehicle according to claim 1, wherein
   the opening, the side wall, the droplet reservoir, and the second drain hole are arranged respectively on a downstream side of the cooling heat exchanger in the airflow direction and on a lower side of a center portion of the cooling heat exchanger in an upper-lower direction.

10. The air conditioning device for a vehicle according to claim 1, wherein
    the second water receiver therein has:
       a first wall that is located on an opposite side of the side wall with respect to the opening and protrudes from the partition wall toward a downstream side in the airflow direction; and
       a second wall that protrudes from the first wall toward the side wall,
    the condensate water flows from a side of the first water receiver to the second drain hole through the opening, a first area, and a second area, when an area surrounded by the first and second walls, the partition wall, and the side wall is defined as the first area, and when an area between the second wall and the side wall is defined as the second area, and
    the first and second walls, the partition wall, and the side wall configure a labyrinth seal structure that prevents air after passing through the cooling heat exchanger from flowing from the first water receiver toward the second drain hole through the opening and the first and second areas.

* * * * *